May 2, 1967            C. V. KING            3,317,283
LEAK DETECTING DEVICE
Filed Aug. 13, 1963
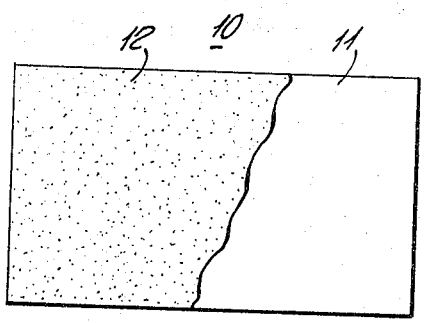
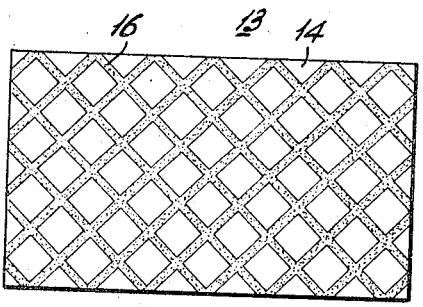
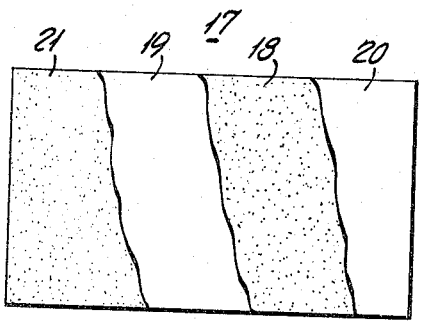
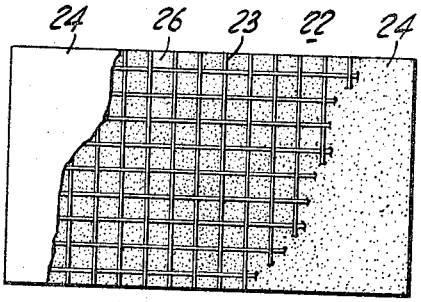
INVENTOR.
CECIL V. KING
BY Stanley Walder
ATTORNEY

United States Patent Office 3,317,283
Patented May 2, 1967

3,317,283
LEAK DETECTING DEVICE
Cecil V. King, Chatham, N.J., assignor to American Gas & Chemicals, Inc., New York, N.Y., a corporation of Massachusetts
Filed Aug. 13, 1963, Ser. No. 301,746
4 Claims. (Cl. 23—253)

The present invention relates generally to improvements in leak detecting devices and it relates more particularly to an improved device for detecting leaks of organic liquid and solvent materials from equipment handling and storing such materials.

In many types of machinery and equipment organic liquids such as oil products are stored, transported and otherwise handled. Examples of such oils and oil products are gasoline, naphtha, kerosene, mineral spirits, diesel fuel, airplane fuels, lubricating oils, hydraulic and brake fluids and the like. Any leakage of these organic liquids from the associated equipment is not only dangerous and presents a health hazard, but frequently adversely effects the operation of such equipment. It is, therefore, highly important that any leaks of the organic liquid from the handling equipment be obviated and as a consequence the presence of such leaks should be rapidly and simply detectable and located even when such leaks are of a relatively minute nature. Many procedures and devices have been proposed for detecting and locating leaks of organic liquids but these possess numerous drawbacks and disadvantages. They are time consuming, slow, of little versatility and adaptability and otherwise leave much to be desired.

It is, therefore, a principal object of the present invention to provide an improved leak detecting device.

Another object of the present invention is to provide an improved device for detecting and locating leaks of organic liquids from tanks, couplings, pipes, valves, and any equipment for the storage, handling or transportation or treatment of organic liquids.

A further object of the present invention is to provide an improved organic liquid leak detecting and locating device which may be easily applied to surfaces of complex and awkward configuration and is immediately sensitive to the presence of an organic liquid issuing at said surface.

Still a further object of the present invention is to provide a detecting device of the above nature characterized by its sensitivity, versatility and wide range of application, ease and simplicity of use and low cost.

The above and other objects of the present invention will become apparent from a reading of the following description taken in conjunction with the accompanying drawing, wherein:

FIGURE 1 is a top plan fragmentary view of a device embodying the present invention;

FIGURE 2 is a top plan fragmentary view of another form of the present device;

FIGURE 3 is a top plan fragmentary view of still another form of the present device; and FIGURE 4 is a top plan fragmentary view of a further form of the present device.

In a sense the present invention contemplates the provision of a device for detecting the presence of an organic liquid comprising an organic liquid absorbent web, and a dye soluble in said organic liquid and carried by said web in a state relatively invisible at a surface of said web, whereby upon exposure to said organic liquid, said dye is dissolved by said liquid and absorbed by said web and imparts a corresponding color to an area of said web surface.

According to a preferred form of the subject leak detecting device the absorbent web is of a fibrous nature and may be woven or non-woven, such as paper, asbestos cloth, or other suitable web which is permeable to organic liquids. Although the web is advantageously white or a light neutral color, it may be any color which contrasts with that of the associated organic liquid soluble dye so as to present a clear visual indication of the coloring of the web by the dye consequent to its exposure to the organic liquid. The web may be impregnated with the organic solvent soluble, water insoluble dye, where the web is a non-woven web such as paper, during the manufacture thereof so as to be dispersed in the web in a substantially invisible condition or the web, per se, may be impregnated with an aqueous dispersion of the dye in a manner which does not significantly impart any color to the web. In the alternative, the web may be coated on a face thereof with a layer which is porous to the organic solvent and has dispersed therein the organic solvent soluble dye. The layer may be in the form of a web laminated to the base web and impregnated with the dye.

In order to facilitate the application of the leak detecting device to the area under investigation, a face thereof is coated with an organic solvent porous adhesive layer which may be water or pressure sensitive or the web face may carry spaced areas of adhesive where such adhesive is not organic solvent permeable. Where a solvent permeable adhesive is employed, the sensing dye may be advantageously dispersed therein. A perforate pliable or plastic web, such as a coarsely woven web or screen of aluminum or other easily bent wire may be laminated to the web to facilitate the shaping of the device and its accommodation to the complex surfaces such as those around valves and joints.

Referring now to the drawing and more particularly to FIGURE 1 thereof which illustrates a preferred embodiment of the present invention, the reference numeral 10 generally designates the improved leak detecting device which may be in the form of sheets or bands, the latter being preferably wound into rolls to facilitate the storing and dispensing thereof. The device 10 includes a preferably white or light neutral colored base or sheet 11 of a woven or non-woven material permeable to oil and oil products, such as paper, natural or synthetic fiber cloths, asbestos cloth or the like. One face of the base sheet 11 is coated with a thin layer 12 of an oil permeable water or pressure sensitive adhesive having dispersed therein in a finely divided state any well known oil soluble, water insoluble dye. Examples of such dyes which are commercially available and highly suitable are DuPont oil red, Allied Chemicals Plasto Pink MBS, Leeben's LS 672 and many others well known in the art. The adhesive component of the layer 12 may, for example, be a conventional wheat starch paste and preferably contains, in addition to the dispersed dye, a finely divided inert pigment such as pulverized limestone, precipitated chalk, titanium dioxide or the like, for example, five times the weight of the starch of powdered gypsum. The amount of dye employed may vary very widely and is not critical. For example, a suitable quantity of dye is about 0.1% by weight based on the weight of the base web 11 or about one pound of dye to 20,000 square feet of base web 11.

In employing the leak detecting device 10 a piece of suitable size or shape is cut therefrom and is applied to the area under investigation by means of the adhesive 12, the opposite surface of the web 11 facing outwardly being visually accessible. Any oil or other organic solvent leaking from the area covered by the device 10 will pass through the dye carrying adhesive layer 12 to leach and dissolve dye therefrom, the dye solution being absorbed by the web 11 to impart an easily visible stain thereto of the color of the dye. The area of the colored stain on the web 11 closely locates the position of the underlying organic solvent leak.

As an alternative to the dispersion of the dye in the adhesive layer 12 it may be distributed in the web 11 in a fine particulate state so as to normally impart no significant color to the web or so that the dispersed particles are merely barely visible as small specks. In use, when the last described device is adhered to a surface under investigation and subjected to an organic liquid leak, the organic liquid will permeate the adhesive layer and be absorbed by the base web. The organic liquid will effect the solution and diffusion of the dye in the base web to produce a correspondingly colored stain thereon which indicates and locates the underlying leak.

In order to permit the use of an impermeable adhesive for applying the detection device to a surface, as seen in FIGURE 2 of the drawing, the detection device carries an adhesive at spaced areas on a face thereof. Specifically, the detection device 13 includes an absorbent fibrous web 14 impregnated with an organic liquid soluble dye in a fine particulate state, as earlier described, so as to normally impart no significant color to the web. A pressure sensitive or water sensitive adhesive 16 is applied to a face of the web 14 in a fine criss-cross pattern, as shown, or in any manner which leaves a great proportion of the web surface free and uncoated throughout the full extent thereof. Thus, when the leak detection device 13 is applied to a surface under investigation most of the underface of base web 14 is exposed directly to said surface so that any leaking liquid immediately enters the web to provide a color indication. However, even if the adhesive layer 16 directly overlies the leak, if the adhesive is permeable, the liquid will pass to the base web 14 to impart a colored stain thereto and if impermeable, the liquid will easily bypass the adhesive area which has at least one small dimension and reach the base web 14 and effect the coloring of an area thereof.

In FIGURE 3 of the drawing, there is illustrated another embodiment of the present invention in which the detection device 17 is of a laminated structure. The detection device 17 includes an intermediate permeable fibrous web, for example, paper which has been dyed, preferably heavily, with an oil soluble dye. The dyeing of the web 18 may be accomplished by dissolving the dye in a volatile hydrocarbon such as naphtha and applying the solution to the web 18 by dipping or spraying and thereafter drying the web 18. The dyed web 18 is sandwiched between and laminated to inner and outer permeable fibrous webs 19 and 20 respectively which may likewise be formed of paper. The webs 18, 19 and 20 are cemented to each other by any suitable oil permeable adhesive. The free face of the inner web 19 is coated with an oil permeable water or pressure sensitive adhesive layer 21.

The detection device 17 is employed in the same manner as the devices 10 and 13 earlier described. Upon exposure to a leak of oil or other organic solvent, the solvent permeates the adhesive layer 21 and the webs 19 and 18. As the solvent passes through the web 18 it dissolves and leaches some of the dye therein and the dye solution is absorbed by the web 20 to form a highly visible colored stain thereon, indicating and loctating the leak.

Under many conditions it is difficult or impossible to properly position the detection device at a suspected area by the use of an adhesive. In order to obviate the need for an adhesive, a detection device 22 of the structure illustrated in FIGURE 4 is provided. The detection device 22 comprises a perforate pliant ductile or plastic intermediate web 23, such as a coarsely or finely woven screen or cloth of aluminum or other metal wire, or a metal foil which is punctured or perforated throughout its area, and which is easily bent and retains its bent shape. The perforate web 23 is sandwiched between a pair of outer porous absorbent webs 24 which may be formed of paper or the like. The webs 23 and 24 are secured in a laminated assembly by a layer 26 of an oil permeable adhesive disposed between the confronting faces of the webs 24 and filling the interstices of the web 23. The adhesive layer 26 has dispersed therein an oil soluble dye and may be of the same composition as the dye carrying adhesive layer 12 earlier described.

In using the leak detection device 22 it is molded to the surface being investigated so as to engage and closely hug such surface and retain itself thereon. The ductile web 23 maintains the detection device 22 in its shaped and molded condition. The detection device 22 otherwise operates in the manner of those previously set forth. It should be noted that the perforate or punctured web 23 may be employed with any of the earlier embodiments either with or in place of the adhesive used thereby.

The leak detecting devices described above are highly versatile and adaptable and easily applicable to various surfaces of simple or complex configurations and are immediately sensitive to organic liquid leaks, presenting a prompt indication thereof. For example, the conventional jet engine in the fuel line alone employs between fifty and sixty joints and couplings including ten double T joints leading to the fuel injection parts near the front of the engine. The present leak detecting device is highly fitted and suitable for the detection of leaks at these joints and couplings. The engine lines in the plane likewise possess joints and couplings to which the present leak detection device is applicable. Another system where leaks may readily be detected with the present device is the power steering assembly in an automobile. There are many joints in this system, particularly those between pipes and flexible hoses where leaks are common and may not be normally visible.

While there have been described and illustrated preferred embodiments of the present invention, it is apparent that numerous alterations, omissions and additions may be made without departing from the spirit thereof. For example, while only red oil soluble dyes are given above, oil soluble dyes of other colors may be employed as well, such as, black, blue, violet, green, orange, yellow, etc.

What is claimed is:

1. An organic solvent leak detecting device comprising a fibrous web having an organic solvent permeable adhesive coating on a face thereof, said coating having an organic solvent soluble, water insoluble dye dispersed therein whereby an organic solvent applied to said adhesive coating leaches said dye therefrom and imparts therewith a visible stain to said web.

2. The detecting device of claim 1, including a second fibrous web superimposed on and adherent to said coating and means for securing said webs to an object under test.

3. A device for detecting the presence of an organic liquid comprising an organic liquid absorbent web, a dye soluble in said organic liquid and carried by said web in a state of relatively low visibility at a predetermined surface of said web, whereby upon exposure to said organic liquid said dye is dissolved by said liquid and absorbed by said web and imparts a corresponding color of relatively high visibility to an area of said web predetermined surface, and a moldable ductile perforate web formed of a material which is easily deformed and retains its deformed shape affixed to said absorbent web and moldable therewith to permit the forming and retaining of said web in predetermined shapes.

4. An organic solvent leak detecting device comprising a first fibrous web having an organic solvent permeable adhesive coating on a face thereof, said coating having an organic solvent soluble, water insoluble dye dispersed therein, a second fibrous web superimposed on and adherent to said coating, and a perforate pliant web sandwiched between said fibrous webs and moldable therewith to permit the forming and retaining of said webs in predetermined shapes.

References Cited by the Examiner
UNITED STATES PATENTS

| | | | |
|---|---|---|---|
| 2,249,867 | 7/1941 | Snelling | 23—253 X |
| 2,567,445 | 9/1951 | Parker | 23—253 X |
| 2,918,033 | 12/1959 | Snyder. | |
| 2,918,893 | 12/1959 | Norton. | |
| 2,976,124 | 3/1961 | Wittlin | 23—253 |
| 3,046,097 | 7/1962 | Wittlin | 23—253 |
| 3,087,794 | 4/1963 | Free et al. | 23—253 |

MORRIS O. WOLK, *Primary Examiner.*

JOSEPH SCOVRONEK, *Examiner.*